Patented Nov. 16, 1926.

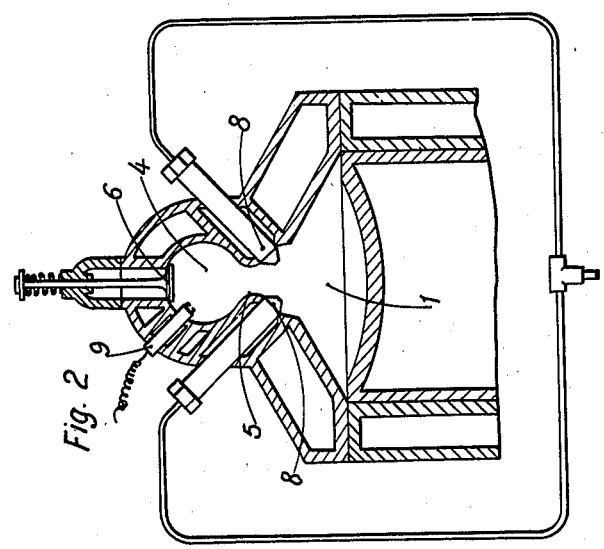
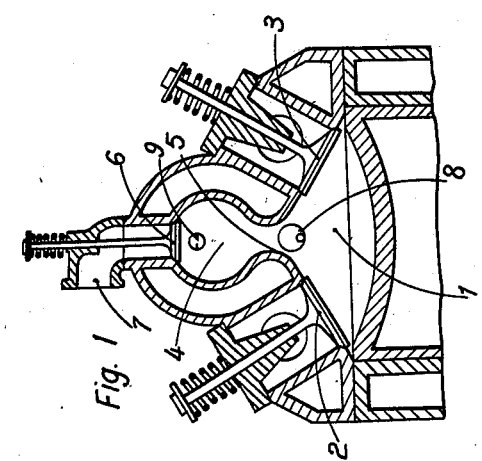

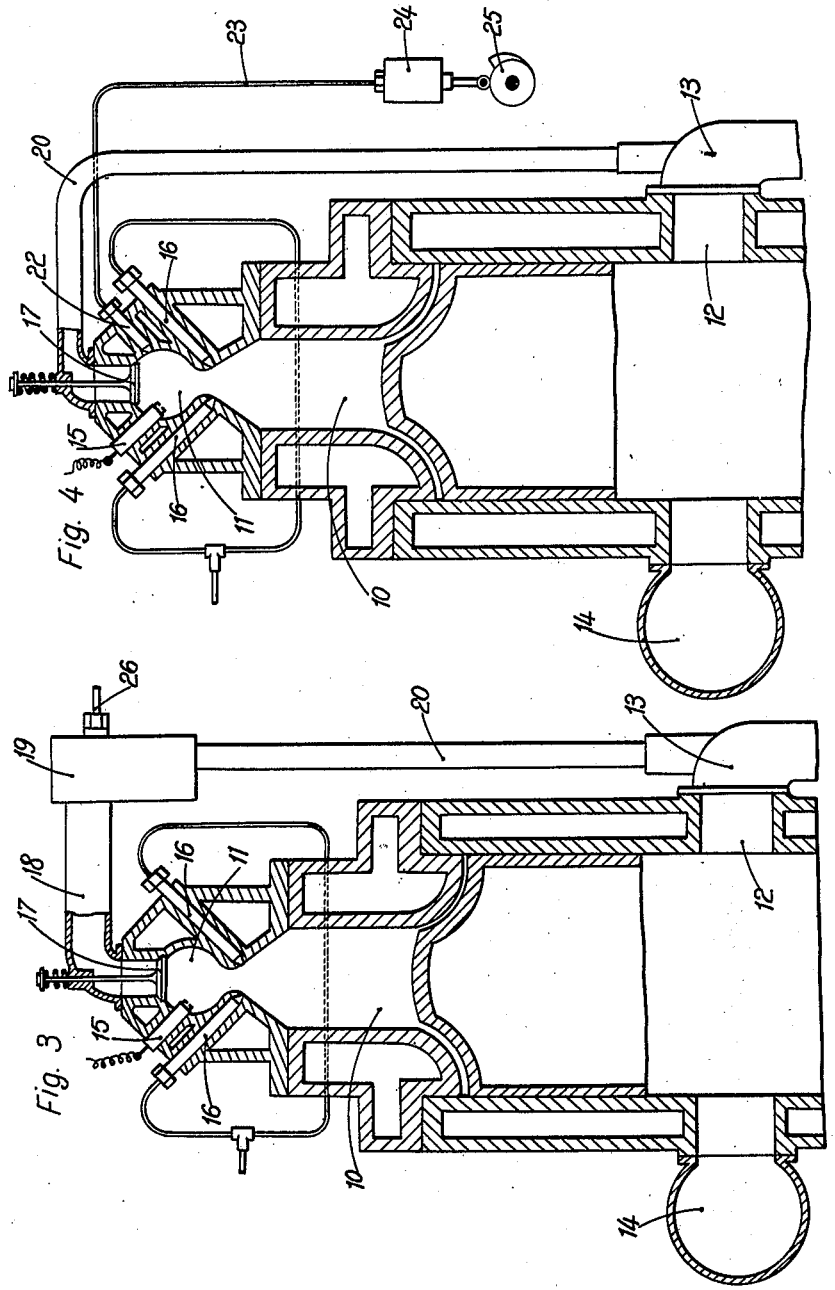

1,607,173

UNITED STATES PATENT OFFICE.

LEON SAIVES, OF BILLANCOURT, FRANCE, ASSIGNOR TO LOUIS RENAULT, OF BILLANCOURT, FRANCE.

INTERNAL-COMBUSTION ENGINE.

Application filed June 11, 1924, Serial No. 719,303, and in France October 2, 1923.

The invention relates to an improvement in the working cycle of internal combustion engines intended to burn slightly volatile oils; this improvement is applicable both to a four stroke cycle engine and to a two stroke cycle engine. The characteristic of this working cycle is that the slightly volatile fuel is injected at the moment of maximum compression, as in Diesel or semi-Diesel engines, but the spraying, the evaporation and the ignition are facilitated by an explosion due to a certain quantity of explosive gas introduced into a chamber connected to the combustion chamber, the ignition of which is obtained as in ordinary internal combustion engines.

In the case of an engine working on the four stroke cycle, at the moment of the suction of pure air into the working cylinder the vacuum set up in the auxiliary explosion chamber allows this latter chamber to be filled, it being in communication with a holder of illuminating gas or any other gas or a gas provided by a carburetor using a fuel more volatile than that feeding the working cylinder. The explosion chamber is connected to the gasholder or to the carburetor by means of an automatic valve which opens under the influence of the vacuum set up in the cylinder at the moment the pure air is admitted thereto.

In the case of a two stroke cycle engine in which the mean pressure in the cylinder is greater than the atmospheric pressure, the carburetor supplying the mixture of volatile fuel is placed under this charging pressure. This increase of pressure around the carburetor is obtained by a branch from the scavenging pipe, the scavenging being caused by the compression of air in the casing, as in a semi-Diesel engine, or alternately by a separate compressor or fan.

It is to be understood that the injection of the volatile fuel into the auxiliary chamber might be provided for by supplying the latter with pure air at the same time as the cylinder at the moment of scavenging.

The invention thus consists in the addition to Diesel or semi-Diesel cycle engines with high compression and injection of an auxiliary chamber connected to the working cylinder, into which there is injected during the admission period an explosive gas; illuminating gas, poor gas, combustible mixture of petrol or alcohol etc., the purpose of this gas being to ensure starting, to warm the engine, to feed it if desired on slowing down, to spray by its premature explosion the heavy oil injected and to raise the temperature, which will allow of the compression being reduced to a certain extent, to suppress the air-compressor in the case of Diesel engines by throttling the explosion chamber in proximity to the working cylinder and by making the injection close to this throttle.

In the accompanying drawing Figs. 1 and 2 show the application of the invention to a four stroke cycle engine. Figs. 3 and 4 show the application to a two stroke cycle engine.

By referring to Figs. 1 and 2 it will be seen that the combustion chamber of the engine is shown at 1; 2 and 3 are the inlet and outlet valves. The explosion chamber of spherical shape is shown at 4, but it may have any other suitable shape; it is connected to the combustion chamber by a throttling passage 5, and comprises a valve 6, which may be automatic, and which allows, at the moment air is admitted to the cylinder, of the introduction of the gas produced by a volatile fuel coming from the carburetor through a pipe 7.

Adjacent to the throttle in the combustion chamber or in the explosion chamber 4 there are located one or more injection nozzles 8 supplied and controlled in the usual way; a sparking plug 9 provides for the ignition of the explosive mixture in the chamber 4. It is obvious that this sparking plug may be replaced by any other system of ignition used on internal combustion engines, such as contact-breaker, incandescent tube, etc.

At the end of the compression the explosion of the mixture contained in the chamber 4 sets up, owing to the difference of pressure in the chambers 4 and 1, a current which passing through the throttle 5 draws with it the heavy fuel injected by the nozzles 8, heats and vaporizes it and ignites it at its entry into the combustion chamber.

In Fig. 3 there is shown a construction of the device which is the object of the invention on a two stroke cycle engine. 10 is the combustion chamber, 11 the explosion chamber, 12 are the inlets for air coming through a collector 13 from the casing of the engine acting as compressor, 14 is the exhaust collector.

The openings 12 and 14 are uncovered by the piston on its down stroke.

The sparking plug 15 and the nozzle or nozzles 16 are located as in the previous case.

The valve 17 could not open automatically at the moment of descent of the piston, the pressure in the cylinder being always greater than the atmospheric pressure. The valve might be controlled, but it would then be necessary to admit under pressure the gas coming through the pipe 18 from the carburetor 19. In order to facilitate the admission the carburetor 19 is gas-tight and works under the pressure of the scavenging air. With this object it is contained in a box connected by pipes 20 to the collector 13. The fuel reaches the carburetor by a pipe 26 coming from a receptacle placed under sufficient load by being subjected to a pressure greater than that of the scavenging air by any suitable means.

Fig. 4 shows the injection arrangement for the volatile fuel into the auxiliary explosion chamber. The chamber 11 comprises as in the previous case the injection nozzles 16 of the heavy fuel, the sparking plug 15, and in addition an injection nozzle 22 for the volatile fuel supplied by a pump 24 discharging into a pipe 23, the piston of which is operated by a suitable drive 25.

Claims:—

1. An internal combustion engine including a main explosion chamber and an auxiliary explosion chamber, a throttling passage connecting the two chambers, a conduit for highly volatile fuel leading into the auxiliary chamber, means for igniting the fuel in said auxiliary chamber, and a plurality of conduits for heavier fuel entering the main chamber adjacent said passage, whereby combustion in the auxiliary chamber may cause a jet of flame to traverse the passage and enter the main chamber, drawing with it the heavier fuel, substantially as described.

2. In an internal combustion engine, an expansion cylinder, a main combustion chamber of less diameter than the bore of said cylinder, a cylinder head containing an auxiliary combustion chamber, a restriction below said auxiliary chamber, and diverging walls leading from the restriction to the main combustion chamber.

3. In an internal combustion engine, an expansion cylinder, a main combustion chamber of less diameter than the bore of said cylinder, a cylinder head containing an auxiliary combustion chamber, a volatile fuel inlet to the auxiliary combustion chamber, a restriction below said auxiliary chamber, a working fuel inlet adjacent the restriction, and diverging walls leading from the restriction to the main combustion chamber.

In testimony whereof I affix my signature.

LEON SAIVES.